United States Patent [19]

Benson

[11] 4,288,190

[45] Sep. 8, 1981

[54] TWO-PIECE GROOVED PIN RETAINER

[75] Inventor: Samuel L. Benson, Clinton, Ind.

[73] Assignee: J. I. Case Company, Racine, Wis.

[21] Appl. No.: 87,581

[22] Filed: Oct. 22, 1979

[51] Int. Cl.³ ............................................ F16B 21/16
[52] U.S. Cl. .................................... 411/511; 411/539
[58] Field of Search ...................... 85/8.9, 8.6, 8.8, 51, 85/36, 7; 403/165, 141; 151/62, 64; 211/192

[56] References Cited

U.S. PATENT DOCUMENTS

| | | | |
|---|---|---|---|
| 604,896 | 5/1898 | Garnett | 85/36 X |
| 2,364,401 | 12/1944 | Stellin | 85/8.6 X |
| 2,647,294 | 8/1953 | Davis | 85/8.9 X |
| 2,713,386 | 7/1955 | Holtz | 85/36 X |
| 3,278,137 | 10/1966 | Hartley | 85/7 X |
| 4,056,035 | 11/1977 | Centera | 85/8.9 |

Primary Examiner—Ramon S. Britts
Attorney, Agent, or Firm—Dressler, Goldsmith, Shore, Sutker & Milnamow, Ltd.

[57] ABSTRACT

A two-piece complementary retaining clip is used to locate and position the end of a shaft passing through a housing. One portion of the clip features a hollow interior including an edge used to engage the shaft. The second portion of the clip fits within the first part of the clip and included edges complementary with the interior edges of the first part of the clip. The second clip also engages the shaft. A removable fastener, attached to the housing, is inserted between the first and second parts of the clip. The fastener anchors and holds the two clips in place.

8 Claims, 2 Drawing Figures

TWO-PIECE GROOVED PIN RETAINER

TECHNICAL FIELD

A device for holding a grooved pin or shaft in place. In particular, a complementary, two-piece, interlocking retaining clip.

BACKGROUND OF THE INVENTION

Retaining rings or clips serve one major function. They furnish a shoulder or edge for holding, locking or positioning machine components such as shafts, pins and studs. Retaining clips are usually formed from thin metal sheets or wire and snapped into an angular groove or ridge on the shaft or pin to be held in place. Such clips can be used to fasten rotating or non-rotating parts or small shafts in equipment and instrument housings.

A majority of the retaining clips provided by the industry are of the one-piece or open ended variety. A frictional or snap-acting fit is used to hold the retaining clip in place. In general, the retaining clip is engaged and/or positioned about the groove of the shaft so as to force the open ends of the retaining clip apart and up and around an edge or shoulder on the ground shaft. The natural spring tendency of the displaced retaining clip is used to encompass the shaft. After installation the clip resumes its original shape (e.g., that shape prior to being imposed over the shaft).

With respect to small pins and shafts, the task of installing such a retaining ring or clip is not too difficult to perform. Sometimes a tool or jig may be used to speed the installation process. However, as shaft size increases considerable force is often necessary to place the retaining ring around and onto the shoulder of the shaft. More importantly, if one is not careful during the installation procedure, a large retaining clip, inadvertently slipping off its shaft, may act like a missile damaging equipment and injuring personnel. A considerable amount of care and time is needed if these clips are to be installed safely. In addition, if the shaft has a high thrust loading more complex retaining rings must be used.

Consequently, where large shafts are involved, or where the retaining ring hardware, as such, is large and awkward to handle or difficult to manipulate, a one-piece retaining ring of traditional design often proves to be unsatisfactory.

Other inventors have sought to improve the method in which a shaft or pin could be held in position. One method is described by A. G. Weston (U.S. Pat. No. 2,967,726). In that device, a ring is circumferentially welded to one end of a concentric pin or shaft. The ring is then joined to a fixed frame or housing by means of a threaded fastener. In such a design the pins are "custom made" and carry, as such, their own locking ring. While shaft retention is good this design precludes shaft rotation.

In a device patented by N. C. Burns (U.S. Pat. No. 1,393,943) the pins of a shackle are connected by a spring clip resting on the shoulders of each pin. A separate threaded fastener holds the clip in place. The clips do not provide any axial or thrust load support. An associated pin socket or bushing takes up the loads transmitted to the shaft. The clips merely prevent the pins from slipping out of the sockets.

Another device is illustrated by F. T. Ellis (U.S. Pat. No. 1,711,018) who uses a removable crescent shaped key to engage shoulders on a pin passing through a clevis. The key fits within a complementary housing attached to the clevis. Here the load support is good, but, due to the crescent shaped design, loading is not completely uniform around the circumference of the shaft.

SUMMARY OF THE INVENTION

According to the present invention, a generally hollow, flat, rectangular first plate and a generally flat, rectangular second plate, complementary to and fitting within the hollow interior of the first plate, are joined together around the shoulder of a grooved pin or shaft to form a retaining clip to hold the pin in place. A threaded fastener and washer are used to hold the two plates in place and thereby lock the pin or shaft in position.

The invention features maximum contact between the two retaining plates and the pin shoulder. Thus, the retaining plates can accept high thrust loads. Removal and installation simplicity is a special feature of the design. In addition, end-play of the pin is virtually eliminated due to the broad support given the shoulder area of the pin.

Heretofore, the only type of retaining ring which could provide a broad shouldered support was a retaining ring of the permanent installation variety. (e.g., one which had to be destroyed in order to allow its removal). In the case of the subject invention, the two piece retaining clip may be used over and over again. In addition, the basic clip can be modified to allow for slight shaft variations. (e.g., material may be added or removed as necessary with little difficulty). The plate can be made as thick as necessary to carry the loads imposed. Most traditional spring clips are very sensitive to shaft diameter and may only be used for the shaft diameter for which they were designed. Thus the present invention features design flexibility and simplified installation.

BEST MODE FOR CARRYING OUT THE INVENTION

Figures 1, 2:
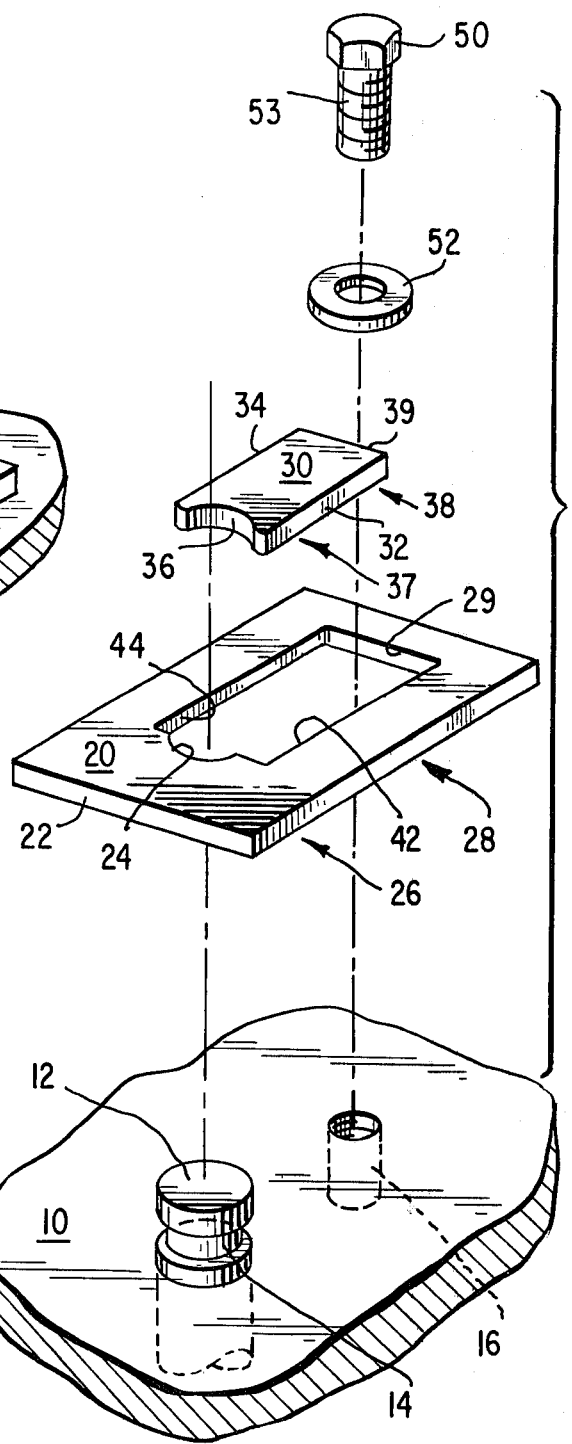
FIG. 1 is a perspective view of the retaining clip of the present invention installed in place about a shaft passing through a housing.
FIG. 2 is an exploded view illustrating the major components of the invention.

While this invention is susceptible of embodiment in many different forms, there is shown in the drawings and will herein be described in detail a preferred embodiment, with the understanding that the present disclosure is to be considered as an exemplification of the principles of the invention and is not intended to limit the invention to the embodiment illustrated.

FIG. 1 of the drawings shows the retaining clip installed in place about a shaft penetrating through a housing. In particular, there is shown a housing 10 through which a shaft 12 passes to expose recessed annular groove or recess 14 (see FIG. 2). The housing 10 also includes a bore 16 adjacent to the shaft 12. As illustrated in the drawings, the bore 16 is threaded to accept a threaded fastener. This is not a requirement. Any suitable means for removably joining a fastener to the housing 10 adjacent to the shaft 12 to be secured may be used. Thus, the environment in which the invention is used includes a housing 10, a shaft 12 having a recess 14, and a means, adjacent the shaft, for removably joining a fastener to the housing.

The first major component of the invention is a generally flat, rectangular, hollow plate or first clip 20. The exterior edges 22 of the plate may be of any convenient shape. This clip 20 is most conveniently formed from a plate of material having the same thickness as the axial dimension of the recess 14 of the shaft 12 to be retained or held in place. However, the only essential requirement for the thickness of the first retaining plate is that it should have an interior edge 24 matching the axial dimension of the recess 14 on the shaft 12. Generally, the thickness needed to support the thrust loads, if any, of the shaft will be the same as the axial dimension of the recess or groove 14.

This first edge or shoulder 24 has a contour substantially complementary to the inner diameter or shape of the annular groove 14 of the shaft 12. The sector occupied by the first edge 24 may be of any convenient angular space. Generally, however, the first interior edge 24 will occupy an annular space of approximately one hundred and eighty degrees. Thus, the first edge 24 of the hollow plate 20 will support and fit within approximately one-half of the annular recess 14 on the shaft 12.

As shown in the drawings the first clip 20 is a flat, symmetrical, rectangular plate. Under these circumstances the hollow plate 20 will hold and position the end of the shaft 12 at an axial distance from the housing 10 approximately equal to the thickness of the plate 20. In other designs, the end 26 of the first clip 20 having the groove engagement edge 24 may be offset from the opposite end 28. In other words, the surface 28 of the first clip 20 facing the housing positions the clip in relationship to the housing 10 while the offset portion 26 positions the first edge 24 at the proper axial distance from the housing so as to engage the groove 14 of the shaft 12.

The second major portion of the invention is the interior retaining plate or second clip 30. This clip 30, like the first clip 20 is formed from a generally flat, solid, metal plate. The four edges 32, 34, 36, 39 of the clip 30 are specially designed and dimensioned so as to fit within the hollow interior of the first clip 20. In particular, it includes two parallel edges 32 and 34 fitting within the two interior edges 42 and 44 respectively of the first clip 20. However, this parallelism between the two corresponding edges of the two clips 20 and 30 is not a requirement. The only design requirement is that the two sets of edges be complementary to each other so as to form a generally close fit when the two are joined so as to fix the position of the second clip 30 relative to the first clip 20.

The second clip also includes a first edge 36 that is complementary to and substantially of the same thickness as the annular groove 14 on the shaft 12. The sector occupied by the first edge 36 is approximately one hundred and eighty degrees. It is desirable that the first edge 36 of the second clip 30 and the first edge 24 of the first clip 20 support as much of the annular groove 14 on the shaft 12 as possible. Therefore, the first clip 20 and the second clip 30 taken together will support, position and retain the shaft 12 relative to the housing 10.

As in the case of the first clip 20 the second plate 30 may be bent or offset. In other words, one end 38 of the second plate 30 has a surface mating with the housing 10 and a second end 37 offset from the housing so as to position the first edge 36 of the second clip with the first edge 24 of the first clip 20. Thus, together the first clip 20 and the second clip 30 would maintain and hold the shaft 12 at the distance from the surface of the housing equal to the desired position of the annular ring or groove 14 from the surface of the housing 10.

It should be understood throughout this description that while a shaft having a generally annular, circular recess or groove has been illustrated in drawings the principles of this invention equally apply to shafts having other types of recesses or shoulders (e.g., square recesses, triangular grooves, etc.). In fact, this is one of the unique and versatile features of the invention. That is, it may be adapted to hold in place a shaft or other pin-like component not necessarily having a circular groove. Any groove means would serve equally well.

One exterior edge 39 of the second retaining clip 30 is spaced a distance from the corresponding interior edge 29 of the first clip 20. Specifically, this provides a space between which a fastener may be attached to the bore 16 of the housing 10. The distance between the corresponding edges 29 and 39 should be such that the two clips 20 and 30 are held against the annular groove 14 of the shaft 12 when the fastener is in place.

Specifically, as illustrated in the drawings, a bolt 50 having a washer 52 is inserted in the space between the two edges 29 and 39 of the first and second clips 20 and 30, respectively. The bolt and washer combination serves two important functions:

On one hand, one exterior edge 53 of the bolt 50 holds the second clip 30 within the annular groove 14 of the shaft 12. The opposite exterior edge (not shown) of the bolt holds the first clip 20 within the annular groove 14 of the shaft 12. Thus, the bolt 50 locks the two plates 20 and 30 together against radial movement from the interior of the groove 14 on the shaft 12.

On the other hand, the bolt 50 also serves to position or anchor the two clips 20 and 30 on the housing 10. It prevents arcuate movement of the two plates relative to the bore 16.

The washer 52 holds the two clips 20 and 30 against the housing 10. Thus, the bolt 50 and washer 52 combination holds the two clips fixed in place. It should be understood that the washer and bolt anchor the two clips in place relative to the housing (and relative to each other) irrespective of, and in addition to, the positioning function served by the two sets of generally complementary edges 32 with 42 and 34 with 44.

Although a bolt and washer are shown for purposes of illustration, other removably connected fasteners may be used to hold the two plates in position relative to the shaft and housing. For example, a bolt having a large flat head may serve the same function. Similarly, a stud may be inserted directly into the housing and a nut and washer used to retain the two plates in position. Other combinations are possible; the principles of the invention remain the same.

Thus, to position and retain a shaft passing through a housing, one needs only to have a bore in that housing to which a removably connected fastener may be joined. The first clip 20 is positioned around one portion of the annular recess 14 of the shaft 12, and the second clip 30 is inserted within the hollow interior of the first clip 20. The second clip 30 also engages the annular recess 14 of the shaft 12. Finally, a suitable fastener 50 is inserted in the space remaining between the first and second clips 20 and 30. This fastener 50 and washer 52 are removably joined to the bore 16 of the housing 10 so as to retain the two clips 20 and 30 against the housing and thereby hold the shaft in position relative to the housing.

From the foregoing, it will be observed that numerous variations and modifications may be effected without departing from the true spirit and scope of the novel concept of the invention. It will be understood that no limitation with respect to the specific apparatus illustrated herein is intended or should be inferred. It is, of course, intended to cover by the appended claims all such modifications as fall within the scope of the claims.

What is claimed is as follows:

1. Apparatus for retaining a pin having a circumferential groove, said pin projecting through a bore defined in the surface of a housing, comprising:
   (a) first retainer means, resting flatly on the surface of said housing, for engaging a first portion of said circumferential groove;
   (b) second retainer means, encircling said pin and said first retainer means and resting flatly on the surface of said housing, for engaging a second portion of said circumferential groove, said second retainer means having a first interior edge which is complementary to said second portion of the circumferential groove; and
   (c) one removable headed fastener for holding said first retainer means and second retainer means together about said pin and for holding said first retainer means and said second retainer means fixed flatly in place relative to the surface of said housing such that said pin is free to rotate relative to said housing.

2. The apparatus defined in claim 1, wherein said removable headed fastener is interposed between an exterior edge of said first retainer means and an interior edge of said second retainer means such that the headed portion of said fastener overlaps said first retainer means and said second retainer means.

3. A clip for retaining a grooved pin which projects through a bore defined in the flat surface of a a housing, comprising:
   (a) first flat plate means, resting flatly against said housing and fitting within a first portion of said grooved pin, for holding the grooved portion of said pin at a spaced axial distance from the surface of said housing;
   (b) a fastner, removably joined to said housing and disposed against an exterior edge of said first flat plate means, for holding said first flat plate means radially disposed against said grooved pin;
   (c) second flat plate means, encompassing said pin said first flat plate means and said fastener and fitting within a second portion of said grooved pin, for locking said first flat plate means against radial movement relative to said fastener and for holding said pin at a spaced axial distance from the surface of said housing,
   said first flat plate means and second flat plate means when placed flatly against said housing surface defining: (1) two supplementary gripping edges which fit within a substantial portion of said grooved pin; and (2) two opposed edges through which said fastener passes, said fastener being sized in relation to the space between said opposed edges such that said first flat plate means and second flat plate means are constrained from moving radially and outwardly from the grooved portion of said pin when said fastener is joined to said housing; and
   (d) flat keeper means, anchored to said fastener, for holding said first flat plate means and second flat plate means flatly against the surface of said housing, thereby locking said pin against axial movement towards and away relative to the surface of said housing.

4. The clip defined in claim 3, wherein said keeper means and said fastener are a washer and a bolt respectfully, said bolt fitting within a threaded bore formed within the surface of said housing adjacent said pin.

5. The clip defined in claim 3, wherein the supplementary gripping edges defined by said first flat plate means and said second flat plate means are complementary to the grooved portion of said pin such that said pin is free to rotate relative to said housing.

6. Apparatus for retaining a grooved pin, the grooved portion of which projects from the surface of a housing, comprising:
   (a) one elongated headed fastener disposed adjacent to said pin and removably joined to said housing, the longitudinal axis of said fastener generally paralleling the longitudinal axis of said pin;
   (b) first flat rectangular retainer means, interposed between said fastener and said pin and resting flatly against the surface of said housing, for engaging a segment of the grooved portion of said pin, radial movement of said first retainer means away from said pin being prevented by said fastener;
   (c) second flat rectangular retainer means, resting flatly against the surface of said housing and encircling said pin and said fastener and said first flat rectangular retainer means, for engaging a segment of the grooved portion of said pin which is opposite to that segment engaged by said first flat rectangular retainer means, and for anchoring said first flat rectangular retainer means in place relative to said fastener, said first flat rectangular retainer means and second flat rectangular retainer means substantially occupying the grooved portion of said pin while permitting said pin to rotate relative to said housing; and
   (d) keeper means, removably interposed between the headed portion of said fastener and said housing surface and overlappingly contacting said first flat rectangular retainer means and second flat rectangular retainer means, for holding said first flat rectangular retainer means and said second flat rectangular retainer means in position against said housing, whereby said keeper means and said fastener restrain said pin, from axial movement towards and away from the surface of said housing.

7. The apparatus defined in claim 6, wherein said keeper means is a flat washer and said headed fastener is a threaded bolt, said first and second retainer means being held flatly against the surface of said housing by said washer and bolt.

8. The apparatus defined in claim 6, wherein said first flat retaining means and said second flat retainer means each include edges which are complementary to said groove means and supplemental to each other.

* * * * *